United States Patent
Hall et al.

(10) Patent No.: US 7,323,975 B2
(45) Date of Patent: Jan. 29, 2008

(54) TIRE PRESSURE MONITORING SYSTEM AND METHOD THEREFOR

(75) Inventors: Wallace T. Hall, Fenton, MI (US); Richard J. Knoll, Swartz Creek, MI (US); Brian K. Bartnick, Ortonville, MI (US)

(73) Assignee: General Motors Corporation, Detroit, MI (US)

( * ) Notice: Subject to any disclaimer, the term of this patent is extended or adjusted under 35 U.S.C. 154(b) by 351 days.

(21) Appl. No.: 11/109,265

(22) Filed: Apr. 19, 2005

(65) Prior Publication Data

US 2006/0232390 A1    Oct. 19, 2006

(51) Int. Cl.
*B60C 23/02* (2006.01)
(52) U.S. Cl. ............... 340/442; 340/443; 340/444; 340/445; 340/446; 340/447
(58) Field of Classification Search ......... 340/442, 340/443, 444, 445, 446, 447
See application file for complete search history.

(56) References Cited

U.S. PATENT DOCUMENTS

| 6,294,989 | B1 | 9/2001 | Schofield et al. | |
| 6,445,287 | B1 | 9/2002 | Schofield et al. | |
| 6,472,979 | B2 | 10/2002 | Schofield et al. | |
| 7,053,761 | B2 * | 5/2006 | Schofield et al. | 340/447 |

* cited by examiner

*Primary Examiner*—Daryl C Pope

(57) ABSTRACT

A tire pressure monitoring system for a vehicle with at least one tire includes at least one pressure sensor adapted for sensing pressure inside the at least one tire. The system also includes at least one indicator adapted to communicate a stop signal indicating that pressure inside the at least one tire is equal to a target pressure. The indicator is also adapted to communicate a continue signal indicating that pressure inside the at least one tire is unequal to a target pressure. The continue signal is adapted to indicate how close the pressure inside the at least one tire is to the target pressure. The tire pressure monitoring system further includes a controller in communication with the at least one pressure sensor and the at least one indicator. The controller is adapted to determine the target pressure according to a predicted operating condition of the at least one tire.

21 Claims, 2 Drawing Sheets

TIRE PRESSURE MONITORING SYSTEM AND METHOD THEREFOR

TECHNICAL FIELD

The present invention relates generally to tire pressure monitoring for vehicles and, more particularly, to a tire pressure monitoring system and method therefor for a vehicle.

BACKGROUND OF THE INVENTION

It is known to maintain pressure of a tire of a vehicle within a pressure range recommended by a tire or vehicle manufacturer. Since tire pressure can fluctuate, tire pressure should be checked by a vehicle operator, and adjusted if necessary, on a regular basis. To check the tire pressure, the vehicle operator often uses a hand-held pressure gauge. If the tire is under-inflated, the vehicle operator adds air to the tire via an air hose attached to a tire valve of the tire, and then re-checks the pressure using the hand-held gauge, repeating this process as necessary until the pressure is within the manufacturer's recommended pressure range. Likewise, if the tire is over-inflated, the vehicle operator opens the tire valve to bleed off the excess pressure, and then re-checks the pressure using the hand-held gauge, repeating this process as necessary until the pressure is within the recommended pressure range. This pressure adjustment process can be time-consuming. Also, inherent error of the hand-held pressure gauge can cause the tire pressure to be set at an incorrect pressure level. Thus, there is a need for a more convenient and accurate way of checking tire pressure.

It is also known to provide tire pressure monitoring systems for monitoring pressure in the tires of the vehicle. In a typical tire pressure monitoring system, pressure sensors are operatively coupled to the tires to continually monitor the pressure thereof. When the pressure in one of the tires falls outside the recommended operating pressure range, the respective pressure sensor sends a signal to a controller, which then triggers an alarm. The alarm alerts the vehicle operator that the tire pressure should be adjusted. Once alerted, the vehicle operator can adjust the tire pressure until the pressure is again within the recommended pressure range. As such, tire pressure monitoring systems provide the vehicle operator a convenient way of monitoring the pressure for the vehicle's tires.

There is an ongoing need for an improved tire pressure monitoring system that indicates how close pressure inside a tire is to the recommended pressure during tire pressure adjustment.

Furthermore, tire pressure may fluctuate when the vehicle is initially driven before eventually reaching an equilibrium level. The tire pressure may, in fact, fluctuate to a level outside the recommended pressure range, thereby triggering an alarm in the tire pressure monitoring system. Similarly, if a tire is filled in a relatively hot area, such as a repair garage, and then the vehicle is driven in much colder weather, the ambient temperature change may cause fluctuations in tire pressure outside the recommended pressure range, thereby triggering the alarm. Thus, there is a need for an improved tire pressure monitoring system that guides the vehicle operator during pressure adjustment such that tire pressure is less likely to fluctuate outside the recommended pressure range in these situations.

SUMMARY OF THE INVENTION

It is, therefore, one object of the present invention to provide a new tire pressure monitoring system that indicates how close tire pressure is to a target pressure range during pressure adjustment.

It is another object of the present invention to provide a new tire pressure monitoring system that adjusts the target pressure range such that the tire pressure is less likely to fluctuate outside the recommended tire pressure range.

To achieve the foregoing objects, the present invention is a tire pressure monitoring system for a vehicle with at least one tire. The tire pressure monitoring system includes at least one pressure sensor adapted for sensing pressure inside the at least one tire. The tire pressure monitoring system also includes at least one indicator adapted to communicate a stop signal indicating that pressure inside the at least one tire is equal to a target pressure. The tire pressure monitoring system further includes a controller in communication with the at least one pressure sensor and the at least one indicator. The controller is adapted to determine the target pressure according to a predicted operating condition of the at least one tire.

Further, the present invention is a tire pressure monitoring system for a vehicle with at least one tire. The tire pressure monitoring system includes at least one pressure sensor adapted for sensing pressure inside the at least one tire. The tire pressure monitoring system also includes at least one indicator adapted to communicate a stop signal indicating that pressure inside the at least one tire is equal to a target pressure. The at least one indicator is also adapted to communicate a continue signal indicating that pressure inside the at least one tire is unequal to a target pressure. The continue signal is adapted to indicate how close the pressure inside the at least one tire is to the target pressure.

In addition, the present invention is a method of monitoring pressure inside a tire of a vehicle. The method includes the steps of triggering a pressure adjustment mode, adjusting the pressure inside the tire, and indicating that the pressure inside the tire is approaching a target pressure.

Further, the present invention is a method of monitoring pressure inside a tire of a vehicle. The method includes the steps of determining a predicted operating condition of the tire, determining a target pressure according to the predicted operating condition of the tire, adjusting the pressure inside the tire, and then indicating that the pressure inside the tire is equal to the target pressure.

One advantage of the present invention is that a new tire pressure monitoring system is provided that accurately calculates a target pressure to which the tires should be adjusted according to predicted operating conditions. Another advantage of the present invention is that the tire pressure monitoring system causes the tire pressure to less likely fluctuate outside the recommended pressure range, thereby avoiding the annoyance and inconvenience of the system triggering a high- or low-pressure warning. Yet another advantage of the present invention is that a tire pressure monitoring system is provided that identifies how close the tire pressure is to the target pressure as the tire pressure is being adjusted. Still another advantage of the present invention is that the tire pressure monitoring system allows the vehicle operator to less likely overshoot the desired pressure range, thereby facilitating tire pressure adjustment.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
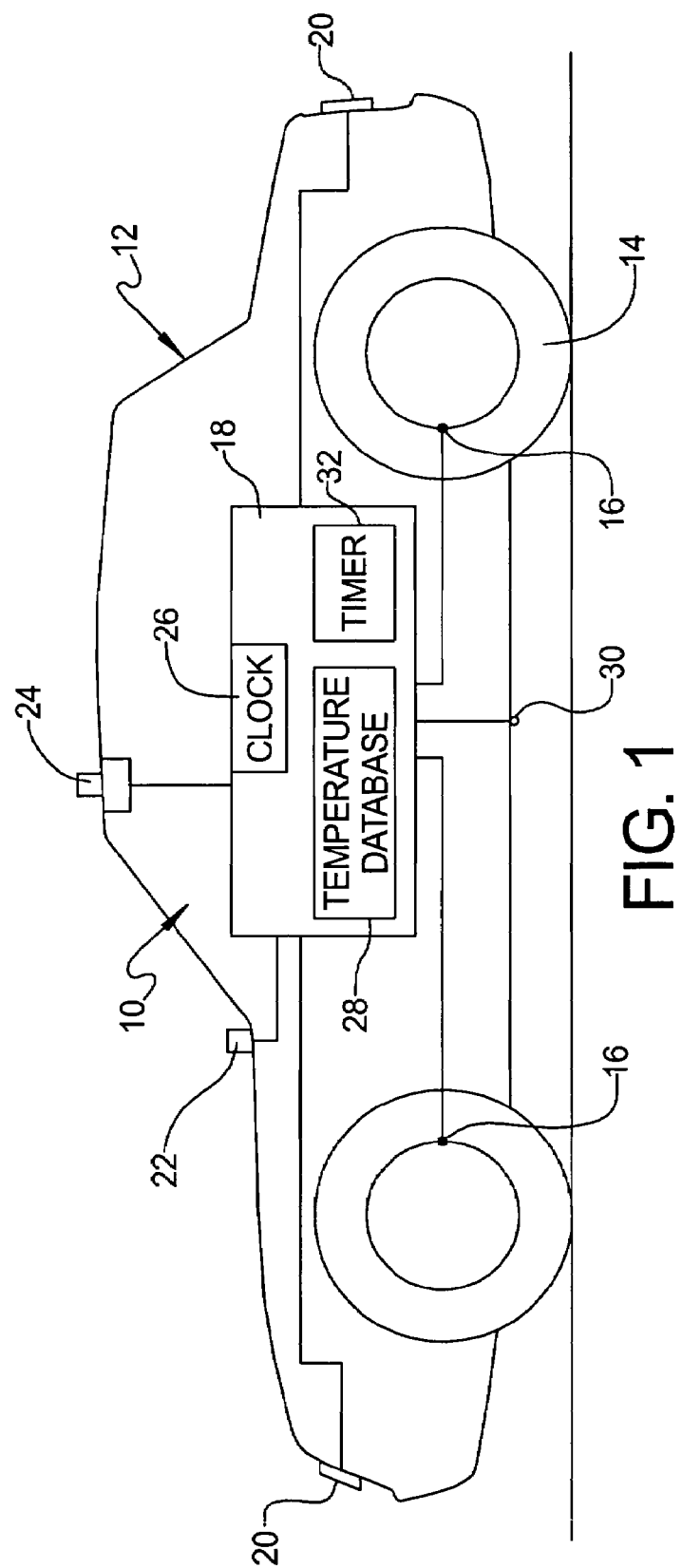
FIG. 1 is a diagrammatic view of a tire pressure monitoring system, according to the present invention, illustrated in operational relationship with a vehicle.

Referring to the drawings and in particular FIG. 1, one embodiment of a tire pressure monitoring system 10, according to the present invention, is shown for a vehicle 12 having at least one tire 14. In the embodiment shown, the vehicle 12 has four tires 14, two of which are illustrated in FIG. 1. Each of the tires 14 have a recommended pressure range, defined as the manufacturer's recommended operating pressure for the tire 14. The exact values of the recommended pressure range can vary by tire, and in one embodiment, this pressure range has a span of approximately seven (7) psi. As will be described in greater detail, the tire pressure monitoring system 10 calculates a target pressure, defined as the pressure to which the tires 14 should be adjusted such that the pressure of the tires 14 is more likely to fluctuate within the recommended pressure range. As will also be described in greater detail below, the tire pressure monitoring system 10 indicates to a vehicle operator (not shown) how close the pressure is to the target pressure during tire pressure adjustment. As such, the vehicle operator is less likely to inadvertently overshoot the target pressure.

The tire pressure monitoring system 10 includes at least one, preferably a plurality of pressure sensors 16. In the embodiment illustrated, there is a pressure sensor 16 in communication with each tire 14. The tire pressure monitoring system 10 may include a pressure sensor 16 for the spare tire 14 of the vehicle 12 for monitoring its pressure as well. The pressure sensor 16 can be one of a known type. Each pressure sensor 16 is adapted for sensing pressure inside the respective tire 14.

The tire pressure monitoring system 10 also includes an electronic controller 18, which is in communication with the pressure sensors 16. As will be described in greater detail below, the controller 18 can monitor the pressure of the tires 14 and detect when tire pressure is unequal to the recommended pressure. The controller 18 also calculates a target pressure as will be described in greater detail below. It should be appreciated that the target pressure can be characterized as a range of pressures, but for purposes of clarity, the target pressure will be referred to as a single pressure level.

The tire pressure monitoring system 10 also includes at least one, preferably a plurality of indicators 20. The indicators 20 can be of a visual type, such as a light bulb, an audible type, such as a speaker, and/or a mechanical type. In the case of a mechanical type, the indicator 20 would include a member that moves depending on tire pressure, such as a movable flag, a movable rod, or a needle that moves over a printed scale. The indicators 20 are in communication with the controller 18, which allows the indicator 20 to indicate to a vehicle operator (not shown) the status of the pressure inside the respective tire 14. For instance, as will be described in greater detail below, each of the indicators 20 communicates a stop signal indicating that pressure inside the respective tire 14 is equal to the target pressure determined by the controller 18. The indicator 20 is also adapted to communicate a continue signal indicating that pressure inside the respective tire 14 is unequal to the target pressure. The continue signals can include a continue-to-fill signal indicating that that pressure inside the respective tire 14 is below the target pressure and a continue-to-deflate signal indicating that pressure inside the respective tire 14 is above the target pressure. It should be appreciated that these signals inform the vehicle operator as to the pressure inside the respective tire 14 during tire pressure adjustment without the use of a separate hand-held pressure gauge.

Also, as will be described in greater detail below, at least one of the continue signals is adapted to indicate how close the pressure inside the respective tire 14 is to the target pressure. As such, the vehicle operator is less likely to inadvertently overshoot the target pressure during tire pressure adjustment.

In the embodiment illustrated, each indicator 20 is mounted adjacent a respective tire 14. For instance, in one embodiment, the existing side marker lamps of the vehicle 12 are each wired to the controller 18 to act as indicators 20. Mounted as such, the indicators 20 communicate the signals to an area adjacent the tires 14. In another embodiment, the indicators 20 are speakers or the vehicle's existing horn, and the signals communicated thereby are audible near the tires 14. It should be appreciated that the vehicle operator can perceive the signals when the vehicle operator is near the tires 14, adjusting the tire pressure.

The tire pressure monitoring system 10 further includes a temperature sensor 22. The temperature sensor 22 can be one of any known type of temperature sensors to sense or detect the ambient temperature of the air surrounding the vehicle 12 and its tires 14. As illustrated, the temperature sensor 22 is in communication with the controller 18 such that the current ambient temperature data can be transmitted thereto. Furthermore, the system 10 includes a location sensor 24 to sense or detect a location of the vehicle 12, and thus the location of the tires 14. The location sensor 24 can be one of any known type, such as a global positioning satellite transponder. As illustrated, the location sensor 24 is in communication with the controller 18 such that the location data can be transmitted thereto.

The controller 18 further includes a clock 26. The clock 26 is of a known type to track and determine the date and time. The controller 18 also includes a database of historic temperature statistics 28. This database 28 preferably includes historical weather statistics for many areas of the world. As will be described below, the location sensor 24, clock 26, and database 28 allow the controller 18 to predict the ambient temperature in which the vehicle 12 will be operating after tire pressure adjustment. Then, the controller 18 determines an appropriate target pressure by comparing the current ambient temperature to this predicted ambient temperature. As such, tire pressure is less likely to fluctuate outside the recommended pressure range.

In addition, the tire pressure monitoring system 10 includes a speed and distance measurement device 30 to detect a speed and a distance traveled by the tires 14. The speed and distance measurement device 30 can be the existing speedometer/odometer mechanism of the vehicle 12, which typically communicates with the output shaft of the transmission to detect speed and distance traveled by the tires 14. However, the speed and distance measurement device 30 can be any other suitable type. The speed and distance measurement device 30 is in communication with the controller 18 such that the speed and distance data can be transmitted thereto. The controller 18 also includes a timer 32 adapted to measure how long the tires 14 remain stationary. As will be described below, the speed and distance measurement device 30 and the timer 32 allow the controller 18 to determine an appropriate target pressure by measuring distance traveled by the tires 14 after being parked for more than a predetermined time.

Figure 2:
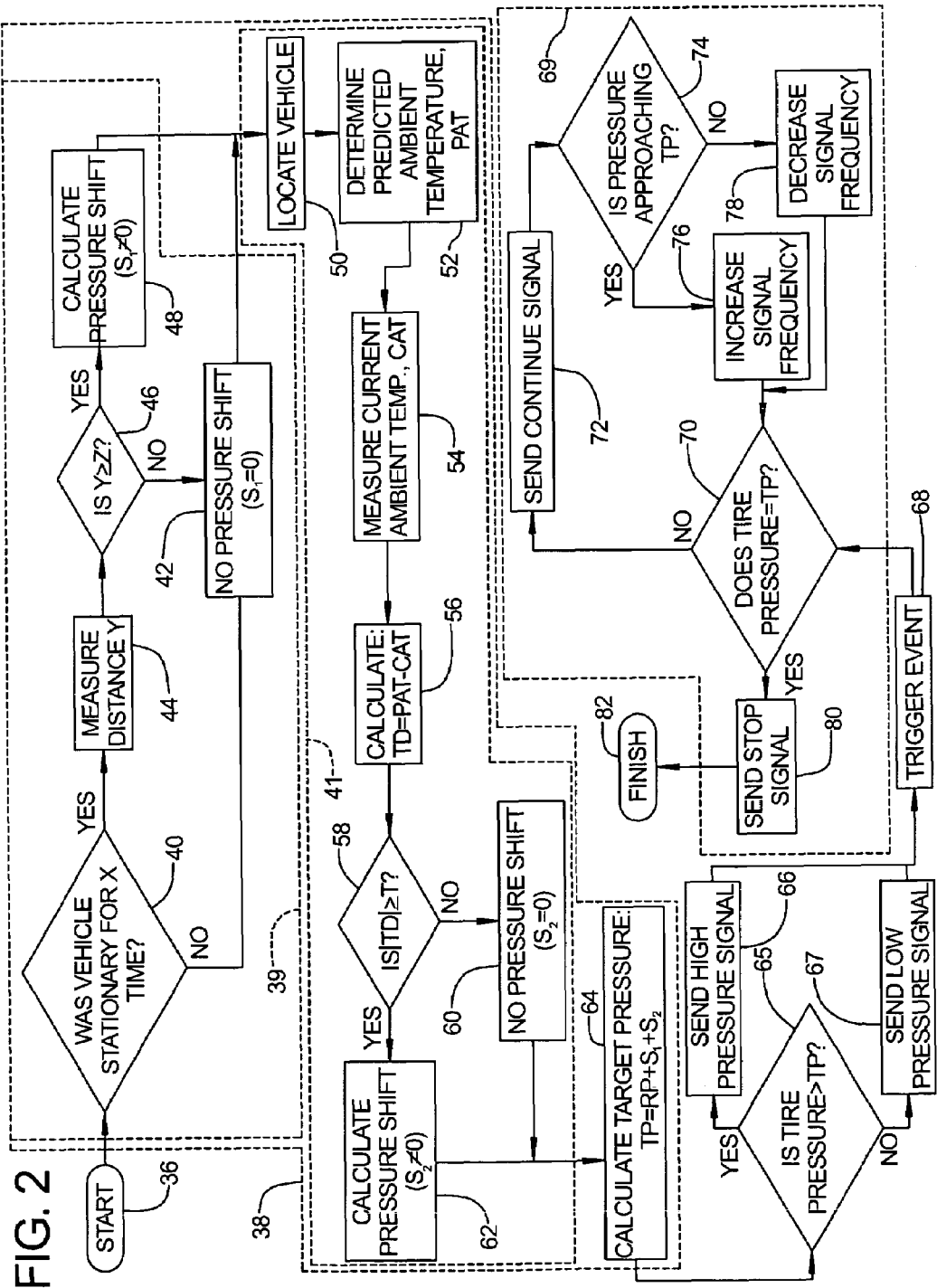
FIG. 2 illustrates a method, according to the present invention, of monitoring tire pressure using the tire pressure monitoring system of FIG. 1.

Referring to FIG. 2, one embodiment of a method, according to the present invention, of monitoring pressure inside the tires 14 of the vehicle 12 is illustrated. The method begins or starts in bubble 36. Subsequently, the method enters into a pressure prediction mode, generally indicated at 38. As will be described in greater detail below, the pressure prediction mode 38 generally involves determining a predicted operating condition of the tires 14 and determining the appropriate target pressure according to the predicted operating condition of the tires 14 such that fluctuations of the tire pressure will more likely occur within the recommended pressure range.

In the embodiment illustrated in FIG. 2, the pressure prediction mode 38 is split into a first prediction mode 39 and a second prediction mode 41. The first mode 39 predicts an operating condition by measuring distance traveled by the tire 14 after the tire 14 has been stationary for more than a predetermined time, and this operation is expressed as a pressure shift variable $S_1$. The second mode 41 predicts an operating condition of the tire 14 by comparing the current ambient temperature to a predicted ambient temperature for the tire 14, and this operation is expressed as a pressure shift variable $S_2$. It should be appreciated that the variables $S_1$ and $S_2$ could be expressed in psi or any other suitable unit of measurement. It should also be appreciated that the variables $S_1$ and $S_2$ can be positive or negative numbers. It should further be appreciated that, although the first mode 39 precedes the second mode 41 in the method illustrated in FIG. 2, the second mode 41 could precede the first mode 39. It should still further be appreciated that the method could include only one of the first mode 39 or the second mode 41 or the method could include neither the first mode 39 nor the second mode 41.

Specifically, the method begins in decision block 40, in which the controller 18 determines whether the vehicle 12, and thus the tire 14, was stationary for a predetermined time, X. For instance, the timer 32 times how long the vehicle 12 remains stationary (i.e., the time during which the speed and distance measurement device 30 determines the speed of the tires 14 is approximately zero). The controller 18 compares this time to the predetermined time, X, which is set according to the time needed for the tires 14 to reach a temperature that is equal to the ambient. If the controller 18 determines that the vehicle 12 was not stationary for X amount of time, the method advances to block 42. In block 42, the method concludes no pressure shift and sets the pressure shift variable $S_1$ to zero.

However, if the controller 18 determines that the vehicle 12 has been stationary for X amount of time, the method advances to block 44. In block 44, the method measures the distance Y traveled after the vehicle 12 has been stationary for more than X amount of time. The speed and distance measurement device 30 is used to measure the distance Y and this amount is communicated to the controller 18. The method then advances to decision block 46.

In decision block 46, the controller 18 determines whether the distance Y measured in block 44 is greater than or equal to a predetermined distance Z, which is set according to the distance needed for the tires 14 to reach an equilibrium temperature. If Y is less than Z (i.e., the tires 14 have reached the equilibrium temperature), the method advances to block 42, previously described, and the pressure shift variable $S_1$ is set to zero. However, if Y is greater than or equal to Z, the method advances to block 48 and calculates the pressure shift variable $S_1$ to a value not equal to zero.

Next, the method enters the second prediction mode 41 and moves to block 50, in which the location sensor 24 senses the location of the vehicle 12 and communicates this data to the controller 18. Then, the method advances to block 52. In block 52, the controller 18 predicts the ambient temperature in which the vehicle 12 will be operating. More specifically, the controller 18 accesses the database 28 to find the average historical temperature corresponding to the current date and time tracked by the clock 26, and current location of the vehicle 12 sensed by the location sensor 24. This predicted ambient temperature is expressed as the variable, PAT. In another embodiment, block 52 could alternatively be completed by a wireless connection to a weather database located remotely from the vehicle 12. In that embodiment, block 52 would involve wirelessly transmitting the time and location of the vehicle 12 and then receiving current weather conditions from the remote database. The method then advances to block 54.

In block 54, the current ambient temperature is measured by the temperature sensor 22. The method advances to block 56 and the controller 18 calculates a temperature difference, TD, between the predicted ambient temperature, PAT, and the current ambient temperature, CAT. The method advances to decision block 58. In decision block 58, the controller 18 compares the absolute value of the temperature difference, TD, with temperature difference constant, T, to determine whether the absolute value of TD is greater than or equal to T. The temperature difference constant, T, is chosen according to a temperature difference great enough to cause tire pressure to fluctuate outside the recommended pressure range. Thus, if the absolute value of the temperature difference, TD, is less than the temperature difference constant, T, the method advances to block 60 and sets the pressure shift variable $S_2$ equal to zero. However, if the absolute value of the temperature difference, TD, is greater than or equal to the temperature difference constant, T, the method advances to block 62 and calculates the pressure shift variable $S_2$ to a value other than zero.

After blocks 60 and 62, the method advances to block 64 and calculates a target pressure, TP. Specifically, the target pressure, TP, equals the sum of the recommended pressure, RP and the pressure shift variables, $S_1$ and $S_2$. In block 64, the controller 18 determines the target pressure, TP, to which the tires 14 should be adjusted during tire pressure adjustment. It should be appreciated that, by adjusting the tire pressure to the target pressure, TP, subsequent pressure fluctuations are more likely to occur within the recommended pressure range such that the alarms of the tire pressure monitoring system 10 are less likely to be triggered. It should also be appreciated that the target pressure, TP, could be expressed as a range of pressures.

After block 64, the method advances to decision block 65 and determines whether the actual tire pressure measured by the pressure sensor 16 is greater than the target pressure, TP, calculated in step 64. If so, the method advances to step 66 and sends a "high tire pressure" signal to the vehicle operator. If not, the method advances to block 67, and sends a "low tire pressure" signal to the vehicle operator. Both signals inform the vehicle operator whether the tire 14 should be inflated or deflated. It should be appreciated that the high and low tire pressure signals could be communicated to the interior and/or exterior of the vehicle 12. It should also be appreciated that the high and low tire pressure signals could further indicate which tire 14 needs pressure adjustment.

Subsequently, the method advances to block 68 and triggers a pressure adjustment mode 69. As will be discussed in greater detail, the vehicle operator changes the pressure inside the tire 14 during the pressure adjustment mode, and the system 10 indicates how close the pressure inside the tire 14 is to the target pressure, TP.

The trigger event of step 68 could be one of several types, including both manual and automatic trigger events. For instance, in one embodiment, the trigger event occurs when the vehicle operator actuates a trigger button (not shown) manually. In another embodiment, the tire pressure monitoring system 10 detects when the vehicle has been placed in park, and this automatically triggers the pressure adjustment mode 69. In still another embodiment, the trigger event occurs automatically when the pressure sensor 16 detects a sudden change to the pressure inside the tire 14 indicative of the vehicle operator adjusting the pressure inside the tire 14. The pressure sensor 16 detects this sudden pressure change when the vehicle operator attaches the air hose to the tire valve to fill the tire 14 or when the vehicle operator opens the tire valve to bleed pressure from the tire 14.

Once the pressure adjustment mode 69 is triggered, the method advances to decision block 70. In decision block 70, the controller 18 determines whether the pressure inside the tire 14 is equal to the target pressure, TP, calculated in block 64. If not, the method advances to block 72, in which the controller 18 sends the particular indicator 20 a continue signal. If the pressure sensor 16 detects the tire 14 is under-inflated, the controller 18 sends the indicator 20 a correlative signal, causing the indicator 20 to communicate to the vehicle operator a continue-to-inflate signal. In contrast, if the pressure sensor 16 detects the tire 14 is over-inflated, the controller 18 sends the indicator 20 a correlative signal, causing the indicator 20 to communicate to the vehicle operator a continue-to-deflate signal. For instance, the continue-to-inflate signal can be a repetitive signal, such as a flashing side marker lamp. The continue-to-deflate signal can be the side marker lamp remaining unlit.

After block 72, the method advances to decision block 74 and determines whether the pressure is approaching TP. The pressure sensors 16 communicate to the controller 18 as to whether or not the tire pressure is approaching the target pressure, TP. If the pressure is approaching the target pressure, TP, the method advances to block 76 and increases the signal frequency of the flashing lamp or audible alarm. If the pressure is moving away from the target pressure, TP, the method advances to block 78 and decreases the signal frequency of the flashing lamp or audible alarms. After blocks 76 and 78, the method then loops within blocks 70 through 78 until pressure inside the tire 14 equals the tire pressure.

In decision block 70, if the pressure inside the tire 14 equals the tire pressure, the method advances to block 80 and sends a stop signal. The stop signal can be the side marker lamp remaining lit. The method finishes at bubble 82. It should be appreciated that the vehicle operator could repeat blocks 70 through 80 for every tire 14 on the vehicle 12. It should also be appreciated that, when each lamp remains lit, the vehicle operator knows the tire pressure is adequate in each tire and is less likely to fluctuate outside the recommended pressure range.

Accordingly, the tire pressure monitoring system 10 identifies how close the tire pressure is to the target pressure as the tire pressure is being adjusted. As such, the vehicle operator is less likely to overshoot the desired pressure range, thereby facilitating tire pressure adjustment. Moreover, the tire pressure monitoring system 10 calculates a target pressure to which the tires should be adjusted according to predicted operating conditions. As such, the tire pressure is less likely to fluctuate outside the recommended pressure range, thereby avoiding the annoyance and inconvenience of the system 10 triggering a high- or low-pressure warning.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A tire pressure monitoring system for a vehicle with at least one tire comprising:
   at least one pressure sensor adapted for sensing pressure inside the at least one tire;
   at least one indicator adapted to communicate a stop signal indicating that pressure inside the at least one tire is equal to a target pressure; and
   a controller in communication with said at least one pressure sensor and said at least one indicator, said controller being adapted to determine the target pressure according to a predicted operating condition of the at least one tire.

2. A tire pressure monitoring system as set forth in claim 1 including a temperature sensor communicating with said controller to detect an ambient temperature.

3. A tire pressure monitoring system as set forth in claim 1 including a location sensor communicating with said controller to detect a location of the at least one tire.

4. A tire pressure monitoring system as set forth in claim 1 including a speed and distance measurement device communicating with said controller to detect a speed and a distance traveled by the at least one tire.

5. A tire pressure monitoring system as set forth in claim 1 wherein said controller includes a clock to determine a date and time.

6. A tire pressure monitoring system as set forth in claim 1 wherein said controller includes a database of historic temperature statistics.

7. A tire pressure monitoring system as set forth in claim 1 wherein said controller includes a timer to detect a time period during which the speed of the at least one tire is approximately zero.

8. A tire pressure monitoring system as set forth in claim 1 wherein said at least one indicator is one of a visual indicator, an audible indicator, and a mechanical indicator.

9. A tire pressure monitoring system as set forth in claim 1 including a plurality of indicators to communicate a signal indicating the pressure inside the at least one tire.

10. A tire pressure monitoring system for a vehicle with at least one tire comprising:
    at least one pressure sensor adapted for sensing pressure inside the at least one tire;
    at least one indicator adapted to communicate a signal indicating that pressure inside the at least one tire is equal to a target pressure and adapted to communicate a signal indicating that pressure inside the at least one tire is unequal to a target pressure; and
    a controller in communication with said at least one pressure sensor and said at least one indicator, said controller being adapted to determine the target pressure according to a predicted operating condition of the at least one tire.

11. A tire pressure monitoring system as set forth in claim 10 wherein said at least one indicator is one of a type chosen from a group comprising a visual indicator, an audible indicator, and a mechanical indicator.

12. A tire pressure monitoring system as set forth in claim 10 wherein said at least one indicator is located on the vehicle near the at least one tire.

13. A method of monitoring pressure inside a tire of a vehicle, said method comprising the steps of:
   triggering a pressure adjustment mode;
   adjusting the pressure inside the tire; and
   indicating that the pressure inside the tire is approaching a target pressure;
   wherein said step of indicating comprises communicating a repetitive continue signal that increases in frequency as pressure inside the tire approaches the target pressure.

14. A method of monitoring pressure inside a tire of a vehicle, said method comprising the steps of:
   triggering a pressure adjustment mode;
   adjusting the pressure inside the tire;
   indicating that the pressure inside the tire is approaching a target pressure; and determining the target pressure according to a predicted operating condition of the tire before the step of indicating.

15. A method as set forth in claim 14 wherein the predetermined operating condition is determined by comparing a current ambient temperature to a predicted ambient temperature.

16. A method as set forth in claim 14 wherein the predetermined operating condition is determined by measuring distance traveled by the tire after the tire has been stationary for more than a predetermined time.

17. A method of monitoring a pressure inside a tire of a vehicle, said method comprising the steps of:
   determining a predicted operating condition of the tire;
   determining a target pressure according to said predicted operating condition of the tire;
   adjusting the pressure inside the tire; and
   indicating that the pressure inside the tire is equal to said target pressure.

18. A method as set forth in claim 17 wherein said step of determining a predicted operating condition comprises comparing a current ambient temperature to a predicted ambient temperature.

19. A method as set forth in claim 17 wherein said step of determining a predicted operating condition comprises measuring distance traveled by the tire after the tire has been stationary for more than a predetermined time.

20. A method as set forth in claim 17 including the step of indicating that the tire pressure is approaching the target pressure before said step of indicating.

21. A method as set forth in claim 17 wherein said step of determining a predicted operating condition comprises communicating a repetitive continue signal that increases in frequency as pressure in the tire approaches said target pressure.

* * * * *